(12) United States Patent
Cadena

(10) Patent No.: US 9,200,666 B1
(45) Date of Patent: Dec. 1, 2015

(54) VEHICLE WHEEL LOCK ASSEMBLY

(71) Applicant: Nissan North America, Inc., Franklin, TN (US)

(72) Inventor: Manuel Alejandro Vite Cadena, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/449,263

(22) Filed: Aug. 1, 2014

(51) Int. Cl.
  F16B 37/14 (2006.01)
  F16B 39/28 (2006.01)
  F16B 41/00 (2006.01)

(52) U.S. Cl.
  CPC ............... *F16B 39/28* (2013.01); *F16B 41/005* (2013.01)

(58) Field of Classification Search
  CPC ...... F16B 37/00; F16B 37/0892; F16B 37/14; F16B 37/145; F16B 39/12; F16B 39/28; F16B 41/005
  USPC .................................. 411/429, 431, 432, 910
  See application file for complete search history.

(56) References Cited

U.S. PATENT DOCUMENTS

| | | | |
|---|---|---|---|
| 1,447,564 A | 3/1923 | Norlund et al. | |
| 3,073,206 A | 1/1963 | Rudolph | |
| 3,492,841 A | 2/1970 | Ipri | |
| 3,540,245 A * | 11/1970 | Pope | 70/231 |
| 3,821,975 A * | 7/1974 | Haker | 81/461 |
| 3,874,258 A * | 4/1975 | Semola et al. | 81/121.1 |
| 4,302,137 A * | 11/1981 | Hart | 411/432 |
| 4,693,655 A * | 9/1987 | Omori | 411/429 |
| 4,726,723 A * | 2/1988 | Bainbridge | 411/432 |
| 4,742,702 A | 5/1988 | Swertz | |
| 5,037,260 A | 8/1991 | Rubin | |
| 5,752,794 A * | 5/1998 | Krawczak | 411/374 |
| 6,318,942 B1 * | 11/2001 | Wieczorek | 411/431 |
| 6,609,401 B1 | 8/2003 | Iskhakbayev | |
| 6,719,511 B2 * | 4/2004 | Notaro et al. | 411/431 |
| 6,910,355 B2 | 6/2005 | Swanson | |
| 8,739,585 B2 | 6/2014 | Sims | |

FOREIGN PATENT DOCUMENTS

| | | |
|---|---|---|
| EP | 476158 A1 | 3/1992 |
| FR | 948413 A | 8/1949 |

OTHER PUBLICATIONS

Product literature for Gorilla Guard Wheel Lock, May 11, 2015.
Product literature for the Original Gorilla Wheel Lock, May 11, 2015.
Product literature for McGard Wheel Lock, May 11, 2015.
Product literature for Torx Tamper-Resistant Fastener, May 11, 2015.

\* cited by examiner

*Primary Examiner* — Roberta Delisle (74) *Attorney, Agent, or Firm* — Global IP Counselors, LLP (57) ABSTRACT

A vehicle wheel lock assembly includes a main body and a hollow cylindrically-shaped sleeve. The main body has a wheel contacting end, a sleeve retaining section and a key receiving end that includes surface contours defining a first key pattern. The hollow cylindrically-shaped sleeve has a first end and a second end, the first end being open with the main body extending therein. The sleeve retaining section retains the sleeve to the main body for free rotation about a central axis of the main body. The sleeve retaining section further is configured to prevent movement of the sleeve in an axial direction of the main body. The second end is closed covering the key receiving end and includes a key receiving aperture providing access to the first key pattern.

18 Claims, 8 Drawing Sheets

VEHICLE WHEEL LOCK ASSEMBLY

BACKGROUND

1. Field of the Invention

The present invention generally relates to a vehicle wheel lock assembly. More specifically, the present invention relates to a vehicle wheel lock assembly that includes a main body with a key portion and a rotatable sleeve fixed in an axial direction to the main body, the rotatable sleeve having a partially closed end covering a majority of a corresponding end of the main body.

2. Background Information

Wheel locks are typically used to prevent unauthorized removal of a wheel from a vehicle. Current wheel lock assemblies typically have a non-wheel contacting end that is completely exposed such that a key pattern formed on or adjacent to the non-wheel contacting end is also completely exposed.

SUMMARY

One object of the present disclosure is to provide a wheel lock assembly with a main body and a rotatable sleeve that restricts access to a non-wheel contacting end of the main body.

Another object of the present disclosure is to provide a main body of a wheel lock assembly with a rotatable sleeve that at least partially covers a non-wheel contacting end of the main body thereby impeding tampering with and unauthorized removal of the wheel lock assembly.

In view of the state of the known technology, one aspect of the disclosure is to provide a vehicle wheel lock assembly with a main body and a hollow cylindrically-shaped sleeve. The main body has a wheel contacting end, a sleeve retaining section and a key receiving end that includes surface contours defining a first key pattern. The hollow cylindrically-shaped sleeve has a first end and a second end, the first end being open with the main body extending therein. The sleeve retaining section retains the sleeve to the main body for free rotation about a central axis of the main body. The sleeve retaining section further is configured to prevent movement of the sleeve in an axial direction of the main body. The second end is at least partially closed covering the key receiving end and includes a key receiving aperture providing access to the first key pattern.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
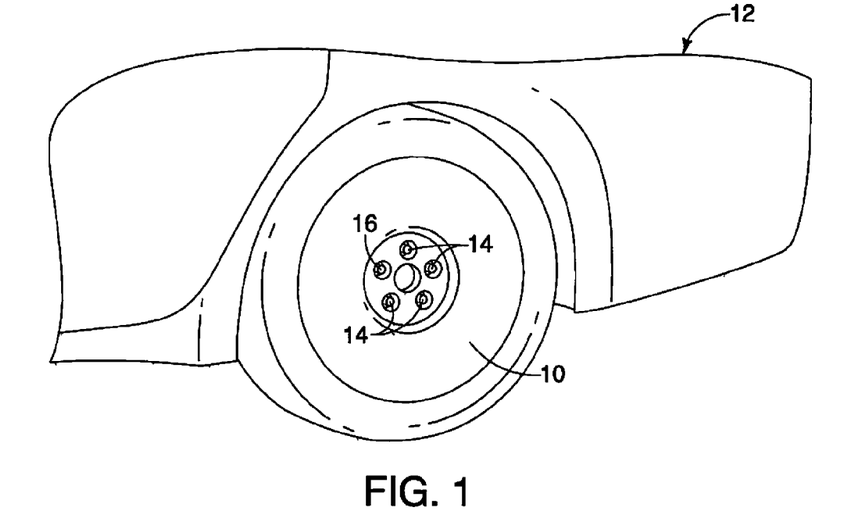
FIG. 1 is a perspective view of a wheel well area of a vehicle showing a wheel attached to the vehicle with lug nuts and a wheel lock assembly in accordance with a first embodiment.

Referring initially to FIG. 1, a wheel 10 attached to a vehicle 12 by lug nuts 14 and a wheel lock assembly 16 is illustrated in accordance with a first embodiment. The wheel lock assembly 16 includes structure that impedes tampering with and unauthorized removal of the wheel 10. Specifically, the wheel lock assembly 16 includes structure that at least partially covers an outer end (a non-wheel contacting end or key receiving end) of the wheel lock structure 16 with a rotatable sleeve thereby impeding any attempts to tamper with the wheel lock assembly 16 or remove the wheel lock assembly 16 without a key. The wheel lock assembly 16 is made of hardened metallic materials and is described in greater detail below.

Figure 2:
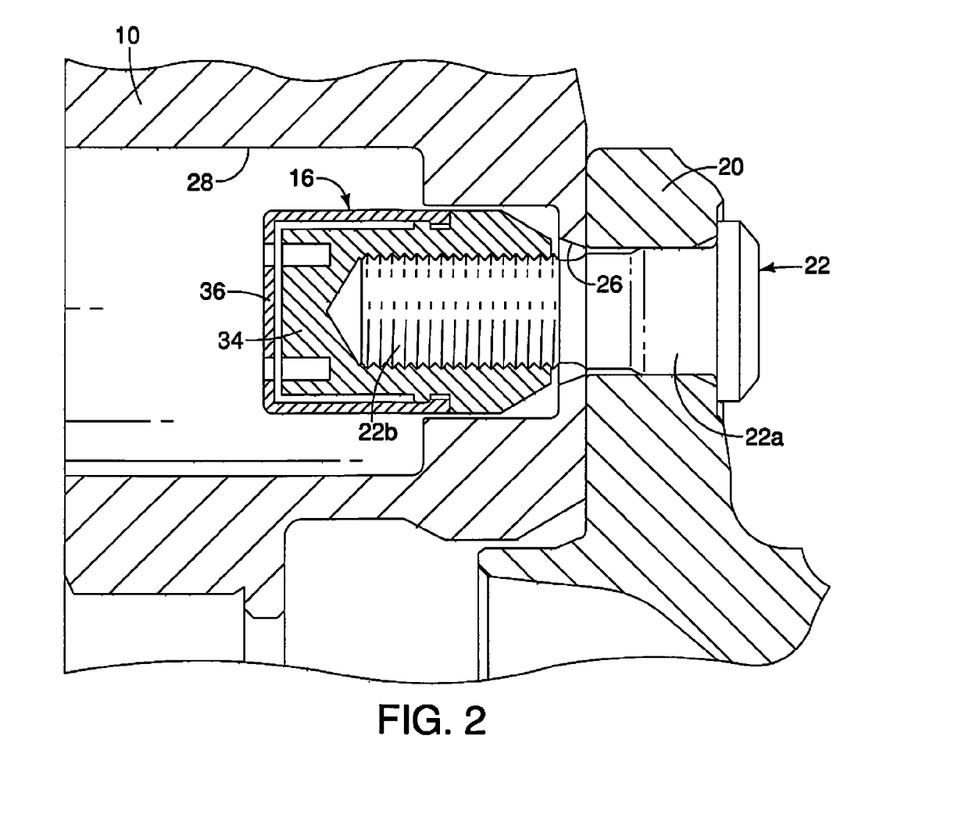
FIG. 2 is a cross-sectional view of a portion of the wheel showing a hub and one lug stud installed to the hub, the wheel and the wheel lock assembly retaining the wheel to the hub in accordance with the first embodiment.

As shown in cross-section in FIG. 2, the vehicle 12 includes an axle hub 20 with a plurality of threaded studs 22 (only one stud 22 is depicted in FIG. 2). Each of the threaded studs 22 includes a fixing portion 22a and a threaded portion 22b. The fixing portion 22a extends through an opening in the axle hub 20 and is fixedly attached to the axle hub 20 via a press-fit engagement. Since axle hubs, threaded studs and press-fit engagements are conventional vehicle features, further description is omitted for the sake of brevity.

The wheel 10 is an annular shaped metallic structure with a rubber tire mounted thereto. The wheel 10 includes a central hub mounting portion formed with a plurality of mounting apertures 26 and a plurality of recesses 28 that are co-axially aligned with and provide access to respective ones of the mounting apertures 26. Since wheels and tires are conventional vehicle components, further description is omitted for the sake of brevity.

Figure 3:
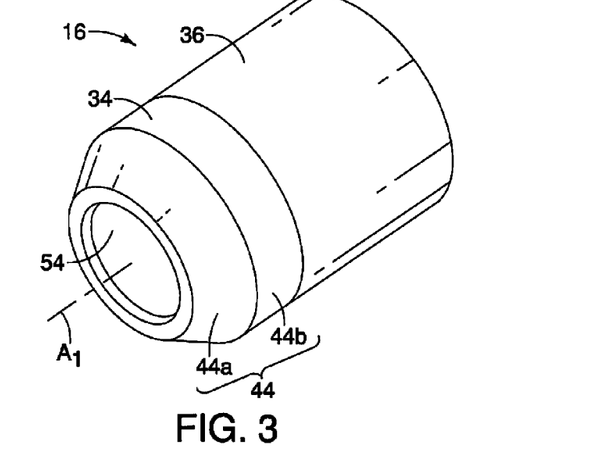
FIG. 3 is perspective view of the wheel lock assembly shown removed from the lug stud and wheel, showing a wheel engaging end of a main body and a sleeve in accordance with the first embodiment.
Figure 4:
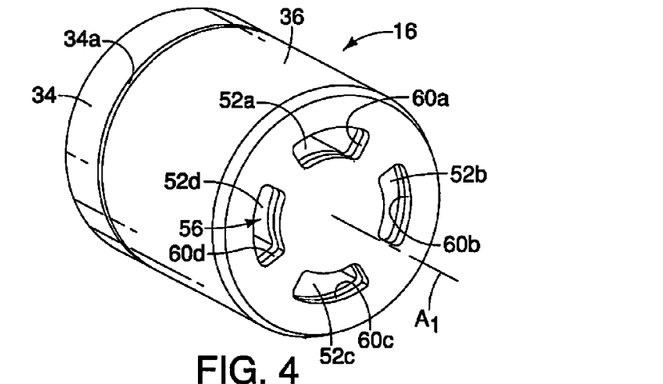
FIG. 4 is another perspective view of the wheel lock assembly showing the sleeve that at least partially covers a key receiving end of the main body, the sleeve including a plurality of openings that align with recesses in the main body that define a first key pattern in accordance with the first embodiment.
Figure 5:
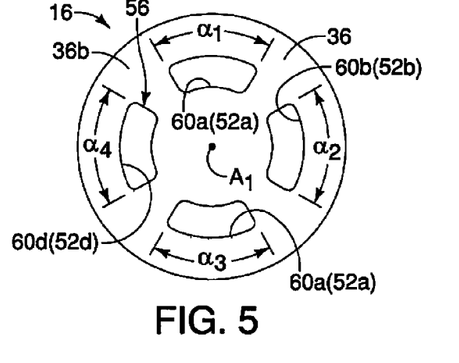
FIG. 5 is an end view of the wheel lock assembly showing the sleeve at least partially covering the key receiving end of the main body with the plurality of openings in the sleeve in alignment with the recesses in the main body thereby exposing the first key pattern in accordance with the first embodiment.
Figure 6:
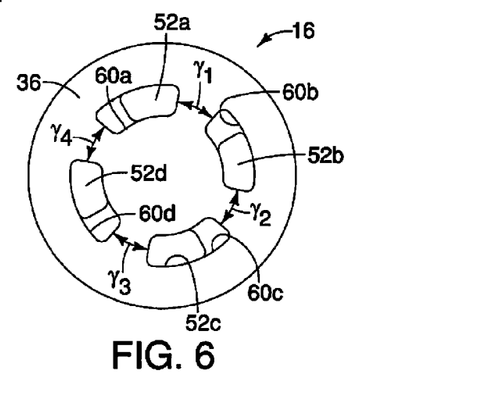
FIG. 6 is another end view of the wheel lock assembly showing the sleeve at least partially covering the key receiving end of the main body with the plurality of openings in the sleeve out of alignment with the recesses in the main body thereby preventing access to the first key pattern in accordance with the first embodiment.

A description is now provided of a first embodiment of the wheel lock assembly 16 with specific reference to FIGS. 2-12. As shown in FIGS. 2-4, the wheel lock assembly 16 basically includes a main body 34 and a sleeve 36. As shown in FIGS. 5 and 6, the sleeve 36 is rotatable about the main body 34, as is described in greater detail below. The wheel lock assembly 16 is provided with a key 40 (shown in FIGS. 9-12) that is configured to engage the wheel lock assembly 16 for installation and removal of the wheel lock assembly 16 from the threaded portion 22b of the threaded stud 22. The key 40 is described in greater detail below.

Figure 7:
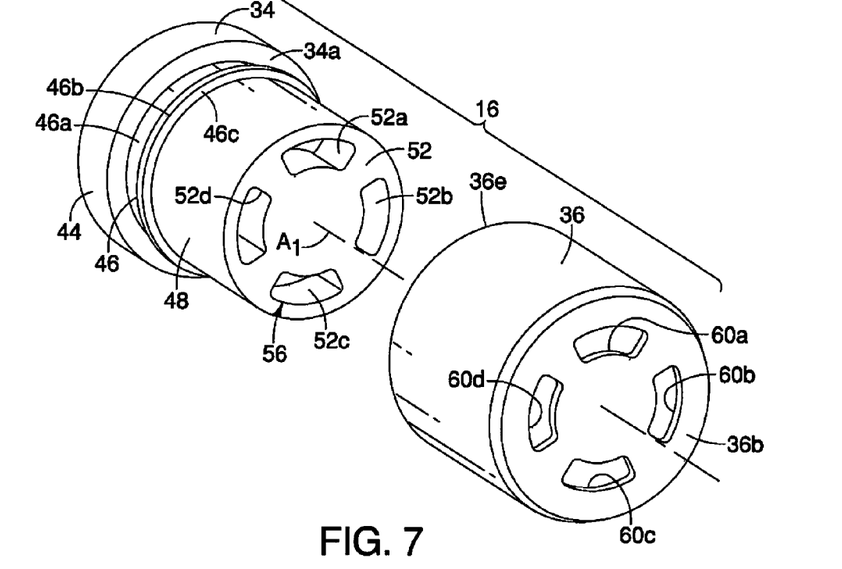
FIG. 7 is an exploded view of the wheel lock assembly showing details of the main body and the sleeve in accordance with the first embodiment.
Figure 8:
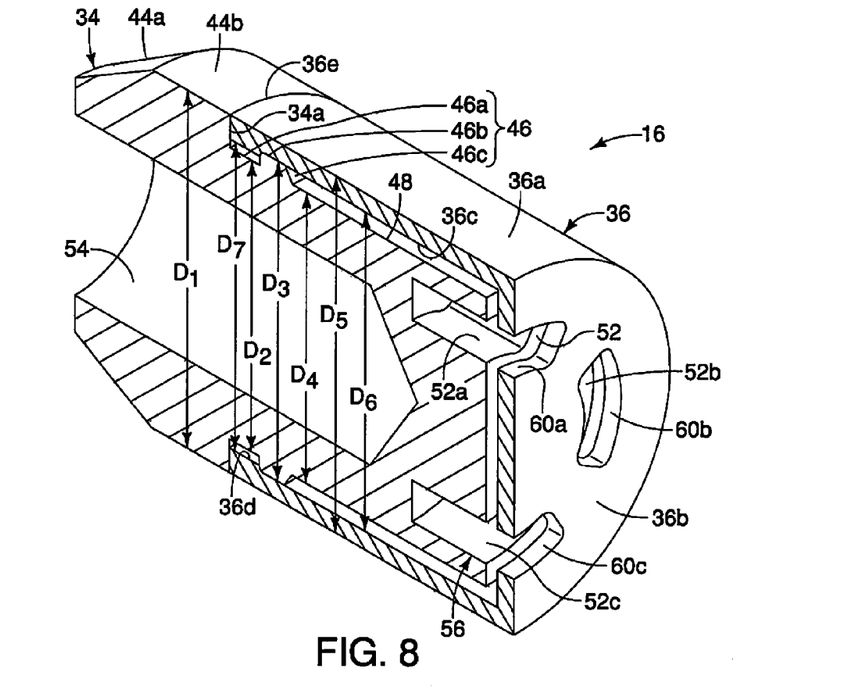
FIG. 8 is a cross-sectional view of the wheel lock assembly showing details of the main body and the sleeve in accordance with the first embodiment.
Figure 9:
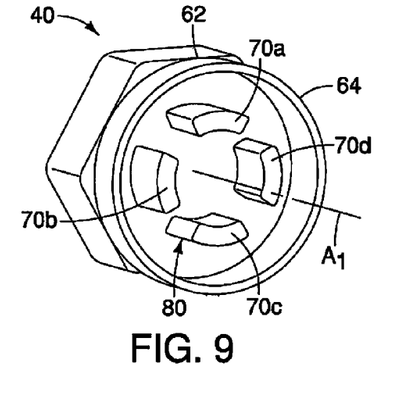
FIG. 9 is a perspective view of a key that includes a second key pattern that mates with the first key pattern of the main body in accordance with the first embodiment.
Figure 10:
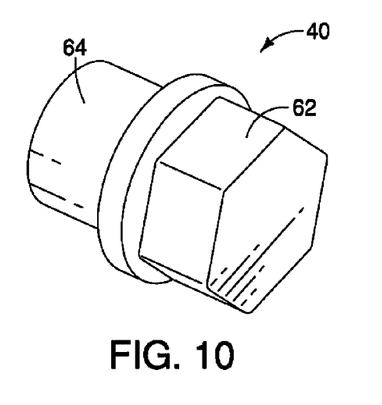
FIG. 10 is another perspective view of the key showing a tool receiving portion in accordance with the first embodiment.
Figure 11:
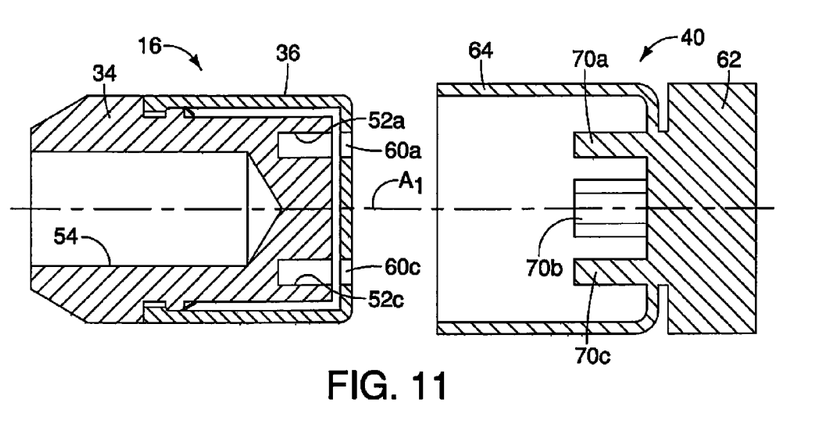
FIG. 11 is a side sectional view showing the wheel lock assembly and the key aligned prior to insertion of the key into the wheel lock assembly in accordance with the first embodiment.

A description of the main body 34 of the wheel lock assembly 16 is now provided with specific reference to FIGS. 7 and 8. The main body 34 includes a wheel engaging end 44, a sleeve supporting section 46, a cylindrically shaped portion 48 and a key receiving end 52 (a non-wheel contacting end). Each of the wheel engaging end 44, the sleeve supporting section 46, the cylindrically shaped portion 48 and the key receiving end 52, has an overall annular shape centered about a central axis $A_1$ of the main body 34. As shown in FIG. 3, the wheel engaging end 44 can include a tapering portion 44a and a cylindrical portion 44b. As shown in FIG. 8, the cylindrical portion 44b of the wheel engaging end 44 has an outer diameter $D_1$. The wheel engaging end 44 further includes a threaded bore 54 that is open at the wheel engaging end 44, but only extends part way through the main body 34. The threaded bore 54 is machined or otherwise manufactured to engage the threaded portion 22b of one of the threaded studs 22.

The sleeve supporting section 46 of the main body 34 includes a recessed annular surface 46a, an annular projection 46b and a ramp surface 46c. The recessed annular surface 46a has an outer diameter $D_2$. The annular projection 46b has an outer diameter $D_3$. The outer diameter $D_3$ is larger than the outer diameter $D_2$ for the purpose of retaining the sleeve 36, as is explained in greater detail below. The ramp surface 46c has a gradually diminishing outer diameter going from the third diameter $D_3$ toward the key receiving end 52.

The cylindrically shaped portion 48 has an outer diameter $D_4$ that is approximately the same as the outer diameter $D_2$, but can be any diameter as long as the outer diameter $D_4$ is less than the outer diameter $D_3$ and is dimensioned such that the ramping surface 46c assists in the installation of the sleeve 36, as described below.

As shown in FIG. 8, the sleeve 36 includes an annular body portion 36a (a cylindrically shaped portion) having an end cover or end cap portion 36b, an inner surface 36c, an inner annular projection 36d and an open end 36e. An outer surface of the annular body portion 36a has an outer diameter $D_5$. The inner annular surface 36c has an inner diameter $D_6$. The inner annular projection 36d extends radially inward from the inner annular surface 36c and has an inner diameter $D_7$. The inner diameter $D_7$ is smaller than the inner diameter $D_6$ and is smaller than the outer diameter $D_3$ of the annular projection 46b of the main body 34.

The sleeve 36 can be installed to the sleeve supporting section 46 by any of a variety of assembly methods. The inner sleeve 36 can be press-fitted on to the sleeve supporting section 46 with the ramp surface 46c providing a means for moving the inner annular projection 36d over the outer annular projection 46b and into the space defined between a shoulder surface 34a of the main body 34 and the annular projection 46b during the installation process. Alternatively or in combination with the above method, the sleeve 36 can be heated such that its overall diameter increases allowing it to be more freely fitted on to the main body 34. After cooling, the diameter of the sleeve 36 diminishes. Once the inner annular projection 36d is pressed past the annular projection 46b, the inner annular projection 36d is retained by the annular projection 46b such that the sleeve 36 is able to rotate about the main body 34, but is prevented from undergoing movement in an axial direction of the main body 34 by interference between the inner annular projection 36d, the annular projection 46b and the shoulder surface 34a.

As shown in FIG. 7, the key receiving end 52 of the main body 34 is provided with a generally flat surface that extends in directions perpendicular to the central axis $A_1$. Alternatively, the key receiving end 52 can be provided with a contoured (non-flat) surface. The key receiving end 52 includes a plurality of circumferentially spaced apart surface contours defined by concaved sections or recesses 52a, 52b, 52c, and 52d that together define a first key pattern 56. In the depicted embodiment, a central region of the key receiving end 52 along the central axis $A_1$ is solid or closed. Alternatively, the key receiving end 52 can include further openings or recesses, as described below in additional embodiments.

The end cap portion 36b of the sleeve 36 includes a plurality of openings 60a, 60b, 60c and 60d. The openings 60a, 60b, 60c and 60d are dimensioned and shaped to be approximately the same as the recesses 52a, 52b, 52c, and 52d in the key receiving end 52 of the main body 34, as indicated in FIGS. 4, 5 and 7-8. Since the sleeve 36 is rotatable, the openings 60a, 60b, 60c and 60d can also be mis-aligned with the recesses 52a, 52b, 52c, and 52d as shown in FIG. 6, thereby preventing access to the recesses 52a, 52b, 52c, and 52d and the first key pattern 56.

In FIG. 5, the sleeve 36 is rotatably positioned such that the openings 60a, 60b, 60c and 60d of the end cap portion 36b align with the recesses 52a, 52b, 52c, and 52d of the main body 34. In FIG. 6, the sleeve 36 is rotated about the main body 34 such that the openings 60a, 60b, 60c and 60d of the end cap portion 36b are not aligned with the recesses 52a, 52b, 52c, and 52d of the main body 34. The position of the sleeve 36 in FIG. 6 represents any of a plurality of non-aligning orientations of the sleeve 36 relative to the main body 34 and the first key pattern 56. Returning to FIG. 5, the openings 60a, 60b, 60c and 60d and the recesses 52a, 52b, 52c, and 52d, when aligned, are generally identically shaped and dimensioned such that the key 40 can be installed thereto, as described in greater detail below. It should be understood from the drawings and the description herein that the openings 60a, 60b, 60c and 60d can be slightly larger than the recesses 52a, 52b, 52c, and 52d to allow easy usage of the key 40.

In the depicted embodiment, corresponding ones of the openings 60a, 60b, 60c and 60d and the recesses 52a, 52b, 52c, and 52d have approximately identical dimensions. Further, each of the openings 60a, 60b, 60c and 60d and the recesses 52a, 52b, 52c, and 52d are circumferentially spaced apart relative to the central axis $A_1$. As shown in FIG. 5, the recess 52a and the opening 60a have an arcuate length or angle $\alpha_1$, the recess 52b and the opening 60b have an arcuate length or angle $\alpha_2$, the recess 52c and the opening 60c have an arcuate length or angle $\alpha_3$, and the recess 52d and the opening 60d have an arcuate length or angle $\alpha_4$.

As identified in FIG. 6, the opening 60a and recess 52a are spaced apart from the opening 60b and the recess 52b by an arcuate length or angle $\gamma_1$, the opening 60b and recess 52b are spaced apart from the opening 60c and the recess 52c by an arcuate length or angle $\gamma_2$, the opening 60c and the recess 52c are spaced apart from the opening 60d and the recess 52d by an arcuate length or angle $\gamma_3$, and the opening 60d and recess 52d are spaced apart from the opening 60a and the recess 52a by an arcuate length or angle $\gamma_4$. It should be understood from the drawings and the description herein that that the angles $\gamma_1$, $\gamma_2$, $\gamma_3$ and $\gamma_4$ apply equally to the relationships depicted in FIG. 5. For the sake of clarity, the angles $\alpha_1$, $\alpha_2$, $\alpha_3$ and $\alpha_4$ are shown in FIG. 5 and the angles $\gamma_1$, $\gamma_2$, $\gamma_3$ and $\gamma_4$ are shown in FIG. 6.

The angles $\alpha_1$, $\alpha_2$, $\alpha_3$ and $\alpha_4$ are depicted in FIG. 5 as being approximately equal for the sake of demonstration. However, the angles $\alpha_1$, $\alpha_2$, $\alpha_3$ and $\alpha_4$ can be dimensioned and arranged such that pairs of the angles $\alpha_1$, $\alpha_2$, $\alpha_3$ and $\alpha_4$ can be equal to one another or each of the angles can have a completely differing arcuate length as compared to the other ones of the angles $\alpha_1$, $\alpha_2$, $\alpha_3$ and $\alpha_4$. Similarly the angles $\gamma_1$, $\gamma_2$, $\gamma_3$ and $\gamma_4$ can be equal to one another or can be completely different from one another thereby providing a multitude of differing first key patterns 56. Further, in the depicted embodiment, the recesses 52a, 52b, 52c, and 52d and the openings 60a, 60b, 60c and 60d are shown as being located radially outward away from the central axis $A_1$ by a generally uniform distance. Alternatively, the recesses 52a, 52b, 52c, and 52d and the openings 60a, 60b, 60c and 60d can be located radially outward away from the central axis $A_1$ by differing distances, thereby further increasing the number of differing combinations of features that define the first key pattern 56.

As shown in FIGS. 9-12, the key 40 includes a tool receiving portion 60, a sleeve portion 62 and a plurality of projections 70a, 70b, 70c and 70d extending from an end surface within the sleeve portion 62. The tool receiving portion 60 is depicted as having a standard hexagonal set of surfaces that can be engaged with a lug wrench or other wrenches in order to install and remove the wheel lock assembly 16. However, it should be understood from the drawings and the description herein that the tool receiving portion 60 can include other tool receiving shapes. The sleeve portion 62 has an inner surface that is slightly larger than the outer diameter $D_5$ of the sleeve 36 such that the sleeve portion 62 easily slips onto and around the sleeve 36 and the wheel lock assembly 16.

Figure 12:
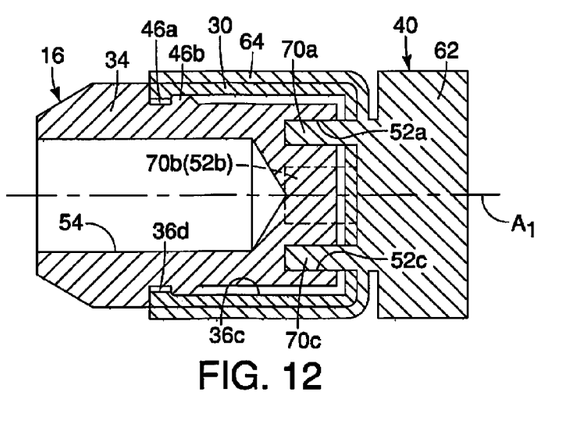
FIG. 12 is another side sectional view showing of the wheel lock assembly and the key with the key inserted into the wheel lock assembly such that the first key pattern and the second key pattern engage, mesh and mate such that the wheel lock assembly and the key rotate together as a single structure in accordance with the first embodiment.

The plurality of projections 70a, 70b, 70c and 70d have circumferential arcuate lengths relative to the central axis $A_1$ that are dimensioned and positioned to complement and mate with the openings 60a, 60b, 60c and 60d in the sleeve 36 and the recesses 52a, 52b, 52c, and 52d in the main body 34. More specifically, the plurality of projections 70a, 70b, 70c and 70d define a second key pattern 80 that is configured and arranged to mate with and engage the first key pattern 56. In other words, the plurality of projections 70a, 70b, 70c and 70d fit into the openings 60a, 60b, 60c and 60d and engage the recesses 52a, 52b, 52c, and 52d, as shown in FIG. 12.

As shown in FIGS. 4-8, the openings 60a, 60b, 60c and 60d (key receiving apertures) and the first key pattern 56 define a circle having a center coinciding with the central axis $A_1$ of the main body 34. The diameter of the circle defined by the openings 60a, 60b, 60c and 60d (key receiving apertures) and the first key pattern 56 has a diameter that is smaller than the outer diameter $D_5$ of the sleeve 36.

Second Embodiment

Figure 13:
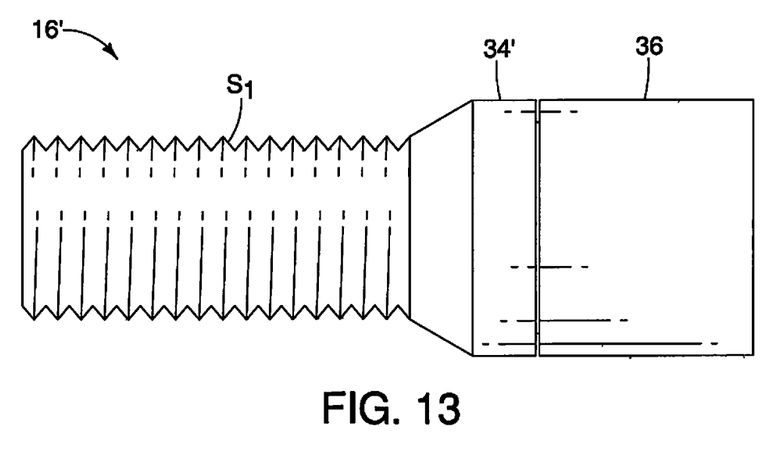
FIG. 13 is a side view of a wheel lock assembly in accordance with a second embodiment.

Referring now to FIG. 13, a wheel lock assembly 16' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the wheel lock assembly 16' includes a main body 34' and the sleeve 36. The sleeve 36 is as described above in the first embodiment. The main body 34' includes all of the features of the main body 34 of the first embodiment, except that there is no threaded bore in the second embodiment. Rather, in the second embodiment, the central bore is replaced with a threaded shaft portion $S_1$. The threaded shaft portion $S_1$ is provided for those vehicles with wheel and hub configurations where there is no lug stud. Rather, the stud is part of a removable member with a threaded shaft, such as the threaded shaft portion $S_1$. More specifically, the threaded shaft portion $S_1$ of the main body 34' is a shaft portion having hub engaging threads.

Third Embodiment

Figure 14:
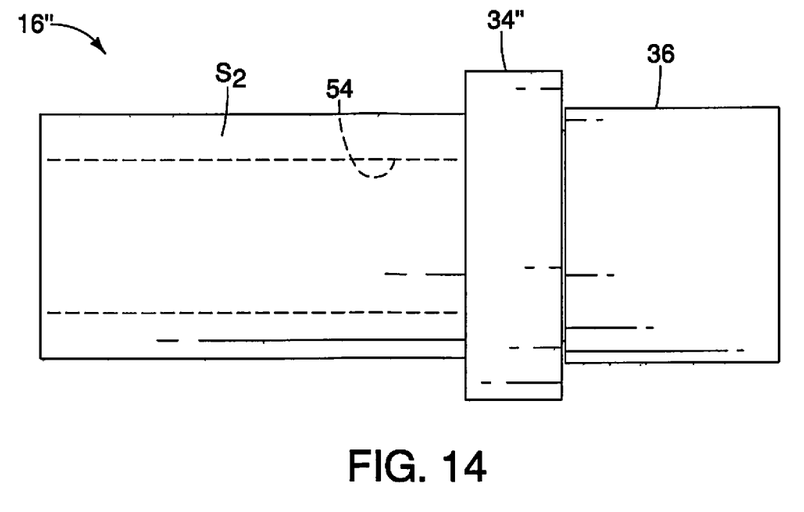
FIG. 14 is a side view of a wheel lock assembly in accordance with a third embodiment.

Referring now to FIG. 14, a wheel lock assembly 16" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the wheel lock assembly 16" includes a main body 34" and the sleeve 36. The sleeve 36 is as described above in the first embodiment. The main body 34" includes all of the features of the main body 34 of the first embodiment, except that the tapering portion is omitted from a wheel engaging end of the main body 34". Further, the main body 34" includes a hollow shaft section $S_2$ that extends the threaded bore 54. The shaft portion $S_2$ is provided for those vehicles with wheel configurations where the wheel has an oversized stud receiving aperture and the stud nut is required to have a shaft extension for proper retention of the wheel.

Fourth Embodiment

Figure 15:
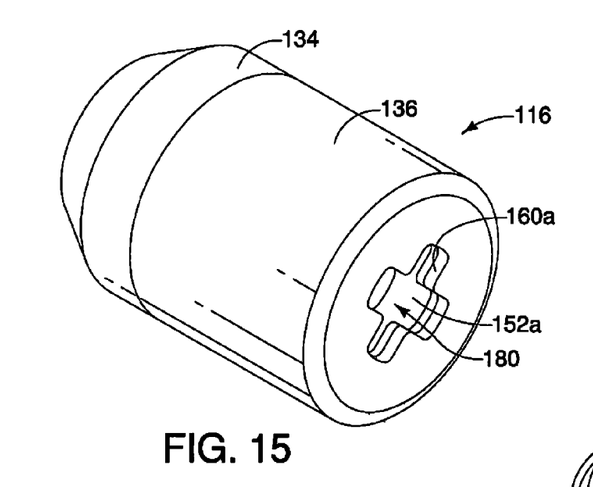
FIG. 15 is a perspective view of a wheel lock assembly showing a main body and a sleeve that at least partially covers a key receiving end of the main body, the sleeve including a single opening that aligns with a recess in the main body that defines a first key pattern in accordance with a fourth embodiment.
Figure 16:
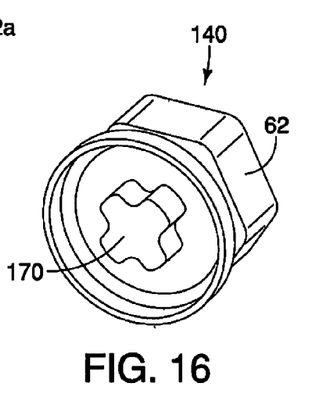
FIG. 16 is a perspective view of a key that includes a projection with surfaces that define a second key pattern shaped to align and insert into the first key pattern in accordance with the fourth embodiment.
Figure 17:
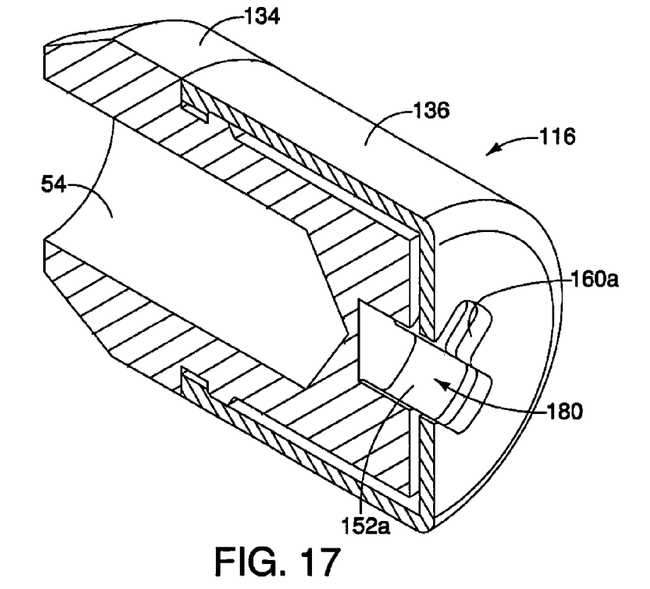
FIG. 17 is a cross-sectional perspective view of the wheel lock assembly showing the main body that includes the first key pattern and the sleeve aligned in accordance with the fourth embodiment.

Referring now to FIGS. 15-17, a wheel lock assembly 116 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the wheel lock assembly 116 includes a main body 134 and a sleeve 136. The main body 134 includes all of the features of the first embodiment except that the first key pattern 56 is replaced with a first key pattern 180. Specifically the first key pattern 180 is defined by a single concaved section or recess 152a that includes a plurality of surface contours defining the first key pattern 180.

In the fourth embodiment, the key 40 of the first embodiment is replaced with a key 140. The key 140 includes the tool receiving portion 62 of the first embodiment, but has a second key pattern 170 that is defined by a single protrusion that extends therefrom. The single protrusion is provided with surface contours shaped and dimensioned to extend into the first key pattern 180.

The sleeve 136 includes all of the features of the sleeve 36 described in the first embodiment except that the plurality of openings 60a, 60b, 60c and 60d are eliminated and replaced with a single opening 160a that is dimensioned and shaped to correspond to the shape and dimensions of the first key pattern 180. The sleeve 136 is rotatable from an aligned position depicted in FIGS. 15 and 17 to any of a plurality of non-aligning positions.

Fifth Embodiment

Figures 18, 19:
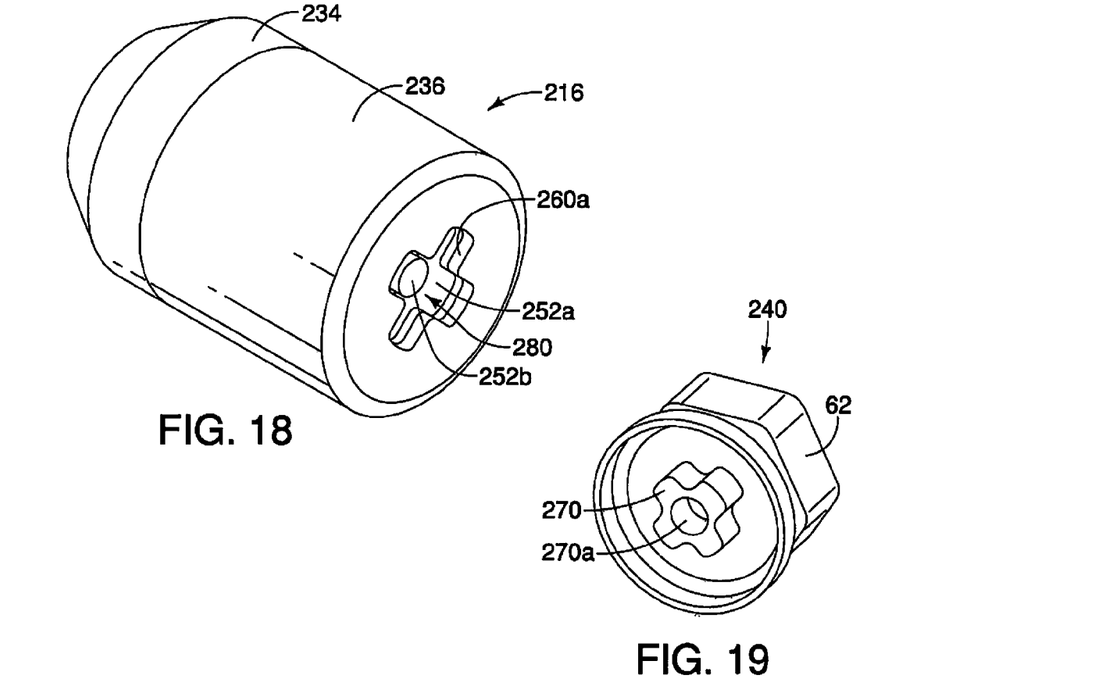
FIG. 18 is a perspective view of a wheel lock assembly showing a main body and a sleeve that at least partially covers a key receiving end of the main body, the key receiving end of the main body having a recess that defines a first key pattern, the recess having a post, and the sleeve including a single opening that aligns with the recess in the main body in accordance with a fifth embodiment.
FIG. 19 is a perspective view of a key that includes a projection with a central aperture, the projection having surfaces that define a second key pattern shaped to align and insert into the first key pattern, and the central aperture of the projection being dimensioned to receive the post of the main body in accordance with the fifth embodiment.
Figure 20:
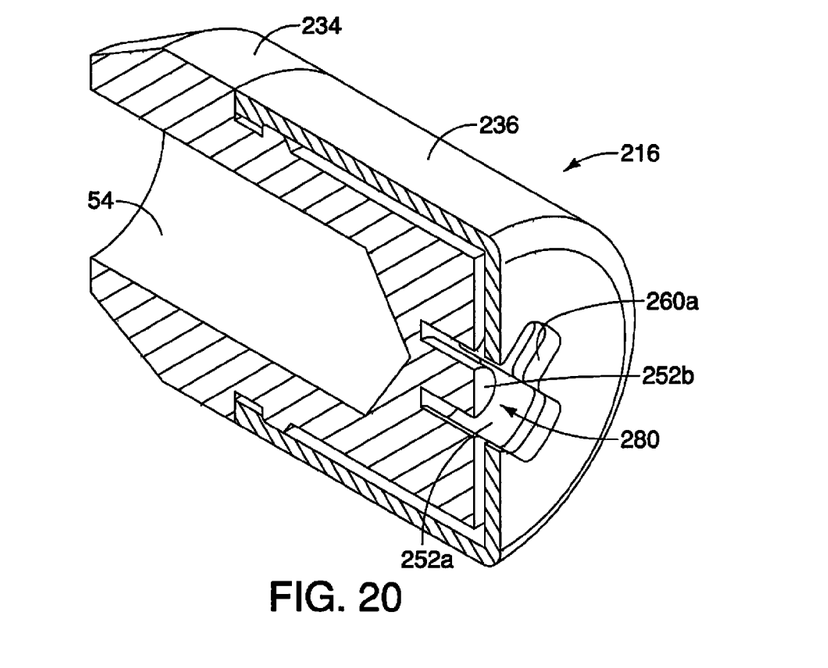
FIG. 20 is a cross-sectional perspective view of the wheel lock assembly showing the main body that includes the first key pattern and the sleeve aligned in accordance with the fifth embodiment.

Referring now to FIGS. 18-20, a wheel lock assembly 216 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the wheel lock assembly 216 includes a main body 234 and a sleeve 236. The main body 234 includes all of the features of the first embodiment except that the first key pattern 56 is replaced with a first key pattern 280. Specifically the first key pattern 280 is defined by a single concaved section or recess 252a that includes a plurality of surface contours defining the first key pattern 280 and a central post 252b.

In the fifth embodiment, the key 40 of the first embodiment is replaced with a key 240. The key 240 includes the tool receiving portion 62 of the first embodiment, but has a second key pattern 270 that is defined by a single protrusion that extends therefrom. The single protrusion 270 is provided with surface contours shaped and dimensioned to extend into the first key pattern 280 and further includes a central aperture 270a dimensioned to receive the central post 252b.

The sleeve 236 includes all of the features of the sleeve 36 described in the first embodiment except that the plurality of openings 60a, 60b, 60c and 60d are eliminated and replaced with a single opening 260a that is dimensioned and shaped to correspond to the shape and dimensions of the first key pattern 280. The sleeve 236 is rotatable from an aligned position depicted in FIGS. 18 and 20 to any of a plurality of non-aligning positions.

Sixth Embodiment

Figure 21:
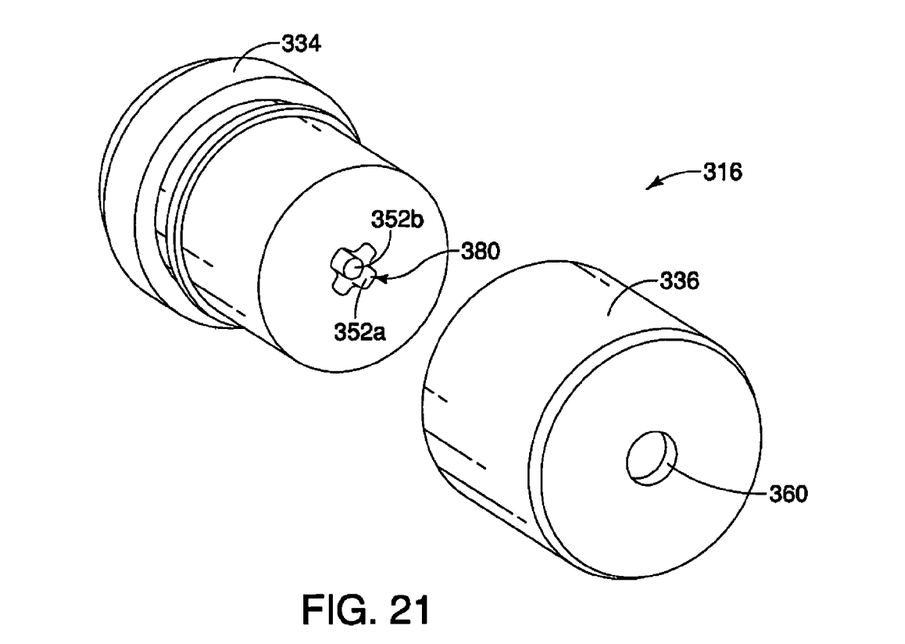
FIG. 21 is a perspective exploded view of a wheel lock assembly showing a main body and a sleeve that at least partially covers a key receiving end of the main body, the key receiving end of the main body having a recess that defines a first key pattern, the recess having a post, and the sleeve including a single opening that encircles the recess in the main body in accordance with a sixth embodiment.
Figure 22:
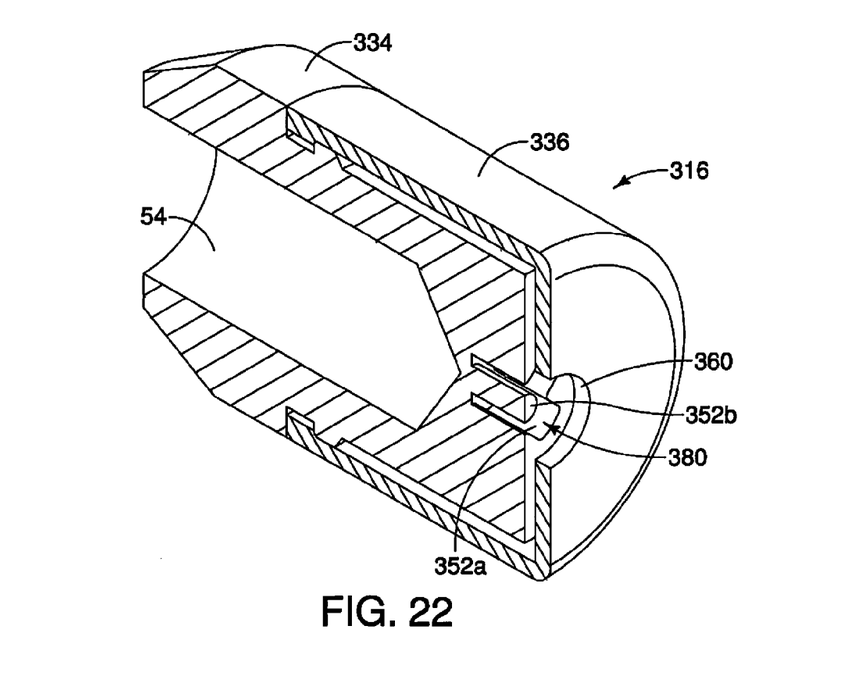
FIG. 22 is a cross-sectional perspective view of the wheel lock assembly in accordance with the sixth embodiment

Referring now to FIGS. 21-22, a wheel lock assembly 316 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the wheel lock assembly 316 includes a main body 334 and a sleeve 336. The main body 334 includes all of the features of the first embodiment except that the first key pattern 56 is replaced with a first key pattern 380. Specifically the first key pattern 380 is defined by a single concaved section or recess 352a that includes a plurality of surface contours defining the first key pattern 380 and a central post 352b. The recess 352a can optionally include a central post 352a, similar to the central post 252a of the fifth embodiment.

In the sixth embodiment, the sleeve 336 includes all of the features of the sleeve 36 described in the first embodiment except that the plurality of openings 60a, 60b, 60c and 60d are eliminated and replaced with a single opening 360a (a key receiving aperture) that is circular in shape and has an outer diameter that is as large or slightly larger than the largest diameter of any of the contoured surfaces of the recess 352a. In other words, the single opening 360a has an outer diameter that is at least as large as the first key pattern 380 such that the first key pattern 380 is fully exposed by the single opening 360a. The sleeve 336 is rotatable about the main body 334, as described above with respect to the sleeve 36 of the first embodiment.

In the sixth embodiment, the key (not shown) is similar to the key 240 described above with respect to the fifth embodiment.

The various features of the vehicle 10, such as the axle hub 20, the wheel 10 and other vehicle elements are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the wheel lock assembly. Accordingly, these terms, as utilized to describe the present invention should be interpreted relative to a vehicle equipped with the wheel lock assembly.

The term "configured" as used herein to describe a component, section or part of a device includes hardware that is constructed to carry out the desired function.

The terms of degree such as "slightly", "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle wheel lock assembly, comprising
  a main body having a wheel contacting end, a sleeve retaining section and a key receiving end that includes surface contours defining a first key pattern, the sleeve retaining section including an annular projection and a recessed annular surface located between the wheel contacting end and the annular projection, the annular projection having an outer diameter that is greater than an outer diameter of the recessed annular surface; and
  a hollow cylindrically-shaped sleeve having a first end and a second end, the first end being open with the main body extending therein, the first end of the hollow cylindrically-shaped sleeve being formed with an inwardly extending projection that extends toward the recessed annular surface, the inwardly extending projection having an inner diameter that is smaller than the outer diameter of the annular projection of the main body such that the annular projection of the sleeve retaining section retains the sleeve to the main body for free rotation about a central axis of the main body, the sleeve retaining section further being configured to prevent movement of the sleeve in an axial direction of the main body, and the second end being at least partially closed covering the key receiving end, the second end including a key receiving aperture providing access to the first key pattern.

2. The vehicle wheel lock assembly according to claim 1, wherein,
  the key receiving aperture of the sleeve and the first key pattern are positioned such that the central axis of the main body extends through both the key receiving aperture and the first key pattern.

3. The vehicle wheel lock assembly according to claim 1, wherein
  the key receiving aperture and the first key pattern are aligned with a circle having a center coinciding with the central axis of the main body, the circle having an outer diameter that is smaller than an outer diameter of the sleeve.

4. The vehicle wheel lock assembly according to claim 1, wherein
  the contoured surfaces that define the first key pattern are located radially outward relative to the central axis of the main body.

5. The vehicle wheel lock assembly according to claim 1, wherein
  the key receiving aperture has a predetermined shape corresponding to the contoured surfaces defining the first key pattern, and the sleeve is rotatable about the main body to an alignment orientation where the predetermined shape of the key receiving aperture aligns with the first key pattern and a plurality of non-aligning orientations where the predetermined shape of the key receiving aperture is not aligned with the first key pattern.

6. The vehicle wheel lock assembly according to claim 1, wherein
  the key receiving end includes a concaved section with surface contours defining the first key pattern being formed on surfaces of the concaved section.

7. The vehicle wheel lock assembly according to claim 6, wherein
  the concaved section of the key receiving end includes a protrusion that extends from a bottom surface of the concaved section to a plane defined by an end surface of the key receiving end.

8. The vehicle wheel lock assembly according to claim 1, wherein
  the key receiving end includes a plurality of concaved sections with the surface contours defining the first key pattern being formed on surfaces of the plurality of concaved sections, the plurality of concaved sections being circumferentially spaced apart from one another and being located radially outward from the central axis of the main body.

9. The vehicle wheel lock assembly according to claim 8, wherein
the key receiving aperture includes a plurality of shaped openings corresponding to the contoured surfaces defining the first key pattern, and the sleeve is rotatable about the main body to an alignment orientation where the plurality of shaped openings align with the concaved sections and a plurality of non-aligning orientations where the shaped openings are not aligned with the concaved sections.

10. The vehicle wheel lock assembly according to claim 1, further comprising
a key having a tool receiving end and a key end, the key end including a plurality of surface contours defining a second key pattern that mates with the first key pattern of the main body when the key end is inserted into the key receiving aperture of the second end of the sleeve, and
the key receiving aperture of the second end of the sleeve is dimensioned to receive the key end of the key.

11. The vehicle wheel lock assembly according to claim 1, wherein
the main body includes an annular surface that extends from the sleeve retaining section to the key receiving end, and
the sleeve covers the annular surface.

12. The vehicle wheel lock assembly according to claim 1, wherein
the first key pattern is centered with respect to the key receiving end and the central axis of the main body, and
the key receiving aperture has a circular shape that is centered with respect to the central axis of the main body such that the first key pattern is fully uncovered by the key receiving aperture.

13. The vehicle wheel lock assembly according to claim 1, further comprising
a key having a tool receiving end and a key end, the key end including a plurality of surface contours defining a second key pattern that mates with the first key pattern of the main body when the key end is inserted into the key receiving aperture of the second end of the sleeve, and
the key receiving aperture of the second end of the sleeve is dimensioned to receive the key end of the key.

14. The vehicle wheel lock assembly according to claim 1, wherein
the main body includes a central bore that is open at the wheel engaging end, the central bore having stud engaging threads.

15. The vehicle wheel lock assembly according to claim 1, wherein
the wheel engaging end includes a tapered surface.

16. The vehicle wheel lock assembly according to claim 1, wherein
the wheel engaging end includes a shaft portion having hub engaging threads.

17. A vehicle wheel lock assembly, comprising
a main body having a wheel contacting end, a sleeve retaining section and a key receiving end that includes surface contours defining a first key pattern; and
a hollow cylindrically-shaped sleeve having a first end and a second end, the first end being open with the main body extending therein, the sleeve retaining section retaining the sleeve to the main body for free rotation about a central axis of the main body, the sleeve retaining section further being configured to prevent movement of the sleeve in an axial direction of the main body, and the second end being at least partially closed covering the key receiving end, the second end including a single key receiving aperture providing access to the first key pattern, the single key receiving aperture of the sleeve being dimensioned such that the first key pattern of the key receiving end of the main body is fully exposed through the single key receiving aperture.

18. A vehicle wheel lock assembly, comprising
a main body having a wheel contacting end, a sleeve retaining section and a key receiving end that includes surface contours defining a first key pattern; and
a hollow cylindrically-shaped sleeve having a first end and a second end, the first end being open with the main body extending therein, the sleeve retaining section retaining the sleeve to the main body for free rotation about a central axis of the main body, the sleeve retaining section further being configured to prevent movement of the sleeve in an axial direction of the main body, and the second end being at least partially closed covering the key receiving end, the second end including a key receiving aperture providing access to the first key pattern, the key receiving aperture having a circular shape that is centered with respect to the central axis of the main body such that the first key pattern is fully exposed by the key receiving aperture.

* * * * *